United States Patent
Kurehashi et al.

(10) Patent No.: US 12,451,014 B2
(45) Date of Patent: Oct. 21, 2025

(54) SYSTEM, METHOD, AND COMPUTER-READABLE STORAGE MEDIUM

(71) Applicant: HONDA MOTOR CO., LTD., Tokyo (JP)

(72) Inventors: Takahiro Kurehashi, Saitama (JP); Shigeru Inoue, Saitama (JP); Yuta Sakagawa, Saitama (JP); Moriya Horiuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 18/450,416

(22) Filed: Aug. 16, 2023

(65) Prior Publication Data

US 2024/0078909 A1 Mar. 7, 2024

(30) Foreign Application Priority Data

Sep. 7, 2022 (JP) .................. 2022-142531

(51) Int. Cl.
*G08G 1/16* (2006.01)
*G06T 7/50* (2017.01)
*G06T 7/70* (2017.01)

(52) U.S. Cl.
CPC .............. *G08G 1/166* (2013.01); *G06T 7/50* (2017.01); *G06T 7/70* (2017.01); *G06T 2207/30236* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2018/0174461 A1* | 6/2018 | Ito | B60W 30/0956 |
| 2018/0180733 A1* | 6/2018 | Smits | G06T 7/521 |
| 2019/0031207 A1* | 1/2019 | Nakamura | G06F 16/9537 |
| 2020/0191975 A1 | 6/2020 | Watanabe | |
| 2021/0256277 A1* | 8/2021 | Yasui | H04W 8/005 |
| 2021/0280066 A1* | 9/2021 | Kurehashi | G08G 1/005 |

(Continued)

FOREIGN PATENT DOCUMENTS

| | | |
|---|---|---|
| JP | H1066138 A | 3/1998 |
| JP | 2017107463 A | 6/2017 |

(Continued)

OTHER PUBLICATIONS

Office Action issued for counterpart Japanese Application No. 2022-142531, transmitted from the Japanese Patent Office on Jul. 29, 2025 (drafted on Jul. 18, 2025).

*Primary Examiner* — Muhammad Adnan

(57) ABSTRACT

A system includes: a first acquisition unit that acquires position information of equipment that is movable, and precision information indicating a precision of the position information; a specification unit that specifies, based on the position information and the precision information, an area where the precision of the position information is lower than a predetermined value, among a plurality of areas where pieces of the equipment exist; and an instruction unit that instructs a moving object which has a function of acquiring the position information of the equipment, to move to the area specified by the specification unit, in order to cause the moving object to measure a position of the equipment.

20 Claims, 8 Drawing Sheets

(56) References Cited

U.S. PATENT DOCUMENTS

| | | | |
|---|---|---|---|
| 2022/0014934 A1 | 1/2022 | Matsunaga | |
| 2022/0182498 A1 | 6/2022 | Singh | |
| 2022/0309625 A1* | 9/2022 | Yasui | B60W 40/06 |
| 2022/0388506 A1* | 12/2022 | Horiuchi | B60W 50/14 |
| 2022/0388528 A1* | 12/2022 | Sakagawa | B60W 30/095 |
| 2022/0392231 A1* | 12/2022 | Horiuchi | G06V 20/58 |
| 2022/0392346 A1* | 12/2022 | Sakagawa | B60W 50/14 |
| 2022/0406190 A1* | 12/2022 | Kurehashi | G08G 1/164 |
| 2023/0237912 A1* | 7/2023 | Horiuchi | G08G 1/166 |
| | | | 701/117 |
| 2023/0266133 A1* | 8/2023 | Horiuchi | G08G 1/13 |
| | | | 701/423 |
| 2023/0306752 A1* | 9/2023 | Horiuchi | G06V 10/95 |
| 2024/0078899 A1* | 3/2024 | Sakagawa | H04W 4/44 |
| 2024/0331166 A1* | 10/2024 | Cao | G06T 7/90 |

FOREIGN PATENT DOCUMENTS

| | | | |
|---|---|---|---|
| JP | 2018100895 A | 6/2018 | |
| JP | 2019045364 A | 3/2019 | |
| JP | 2020122726 A | 8/2020 | |
| JP | 2021117893 A | 8/2021 | |
| JP | 7040827 B1 | 3/2022 | |
| WO | 2020202371 A1 | 10/2020 | |

* cited by examiner

SYSTEM, METHOD, AND COMPUTER-READABLE STORAGE MEDIUM

The contents of the following Japanese patent application(s) are incorporated herein by reference:
NO. 2022-142531 filed in JP on Sep. 7, 2022.

BACKGROUND

1. Technical Field

The present invention relates to a system, a method, and a computer-readable storage medium.

2. Related Art

Patent document 1 discloses a technique for specifying a position of a search target photographed by a camera, and Patent document 2 discloses an ECU including a UWB communication machine configured to transmit/receive an impulse signal to/from a portable terminal to generate distance information to the portable terminal. In recent years, in consideration of persons in vulnerable positions among traffic participants, efforts have been intensified to provide access to a sustainable transport system. To realize this, research and development has been focused on to further improve traffic safety and convenience through research and development regarding a preventive safety technique.

PRIOR ART DOCUMENT

Patent Document 1: Japanese Patent No. 7040827
Patent Document 2: Japanese Patent Application Publication No. 2020-122726

DESCRIPTION OF EXEMPLARY EMBODIMENTS

Hereinafter, embodiments of the present invention will be described. However, the following embodiments are not for limiting the invention according to the claims. In addition, not all combinations of features described in the embodiment are essential to the solution of the invention.

Figure 1:
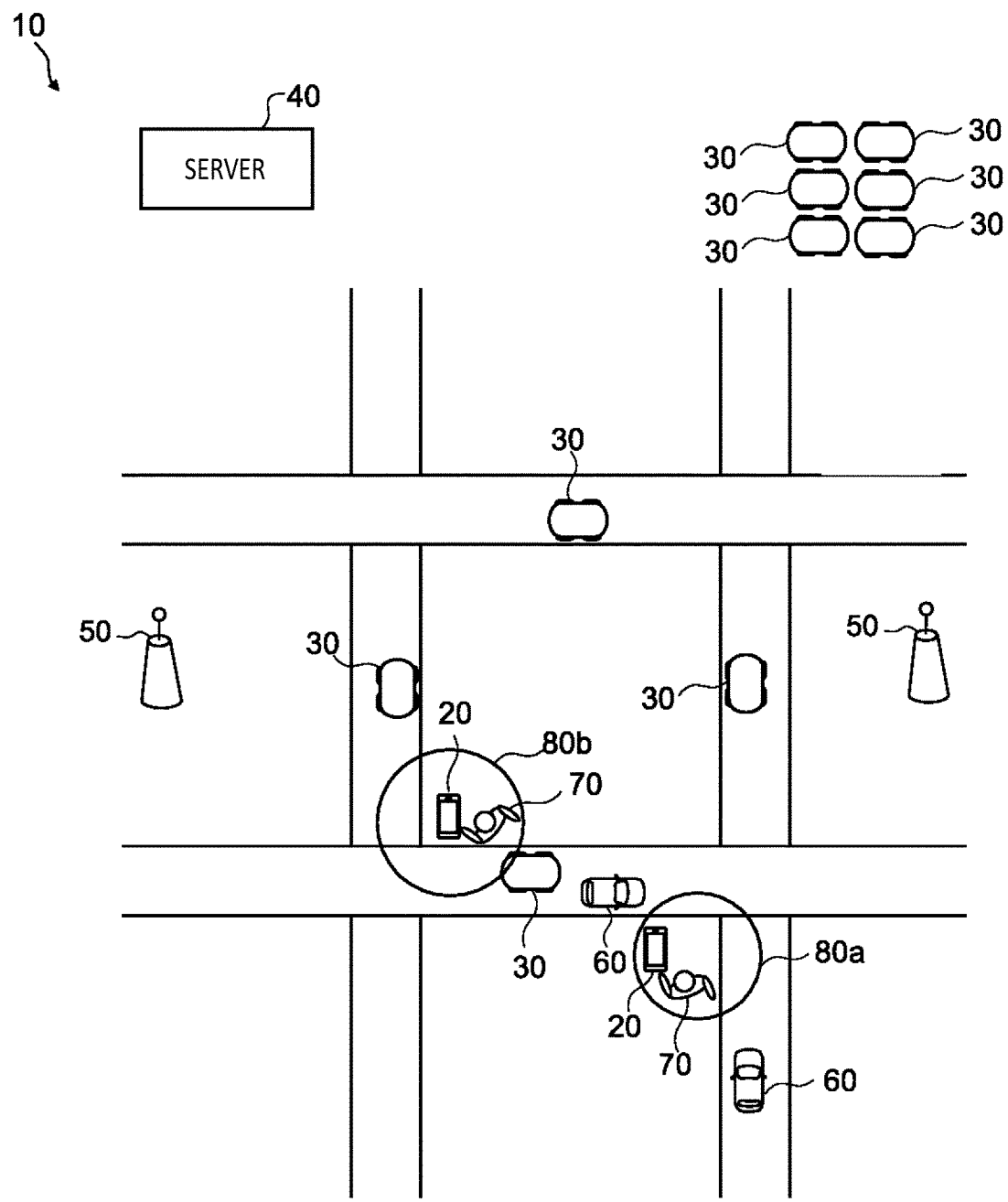
FIG. 1 is a diagram showing an overall configuration of a system 10 according to an embodiment.

FIG. 1 is a diagram showing an overall configuration of a system 10 according to an embodiment. The system 10 includes a server 40, a base station 50, a plurality of moving objects 30, and a plurality of communication terminals 20.

The base station 50 is a base station for a mobile communication (also referred to as mobile communications). The communication terminal 20 is, for example, a terminal that is carried by a person 70. The communication terminal 20 is, for example, a mobile terminal such as a smartphone. The server 40 is a server communicably connected to the base station 50. The server 40 may include, for example, an edge computing server such as a mobile edge computing (MEC) server.

The communication terminal 20 and a vehicle 60 perform the mobile communication through the base station 50 in a vicinity, and communicate with the server 40. The server 40 continuously receives information indicating a position and an advance direction detected by each of the communication terminals 20, and precision information indicating a precision of the position detected by each of the communication terminals 20. The server 40 further receives the information indicating the position and the advance direction detected by each of the vehicles 60.

The server 40 keeps information received from each of the communication terminal 20 and the vehicle 60. The server 40 determines a traffic risk based on the information received from each of the communication terminal 20 and the vehicle 60; and provides the communication terminal 20 and the vehicle 60 with information in relation to the traffic risk. For example, when the vehicle 60 is approaching a position at which the communication terminal 20 exists, the server 40 notifies, via the base station 50, the communication terminal 20 to output an alarm.

Based on the precision information received from the communication terminal 20, the server 40 specifies an area 80*a* and an area 80*b* where the precisions of the positions detected by the communication terminals 20 are low. The server 40 moves the moving object 30 to the area 80*a* and the area 80*b*. The server 40 may instruct the moving object 30 to travel a route for patrolling the area 80 and the area 80*b*, and the moving object 30 may travel the route for patrolling the area 80 and the area 80*b* according to a travel path on which the instruction is provided by the server 40.

The moving object 30 has a function of detecting the position with a high precision. For example, the moving object 30 has a function of measuring the position of the moving object 30 by RTK (Real Time Kinematic) positioning. The moving object 30 further has a camera function and/or a function of detecting the position of the person 70 recognized by a LI DAR, and has a function of measuring a relative position between the moving object 30 and the person 70. The moving object 30 calculates the position of the person 70 based on the position of the moving object 30, and the relative position between the moving object 30 and the person 70, and transmits the calculated position to the server 40.

The server 40 performs various controls based on position information of the person 70 received from the moving object 30. For example, the server 40 may transmit the position information received from the moving object 30 to the communication terminal 20. The communication terminal 20 may provide a service to the person 70 through an application that uses the position of the communication terminal 20 received from server 40. For example, an example of the application that uses the position of the communication terminal 20 can include a path guide application, a store guide application, a game that uses the position, or the like. Other than that, the server 40 may determine a traffic risk at the position of the person 70, based on the position information of the person 70 received from the moving object 30, and the position and speed information of the vehicle 60; and provide the communication terminal 20 and the vehicle 60 with the information in relation to the traffic risk.

The moving object 30 may be, for example, a self-driving vehicle that travels by a self-driving operation. The moving object 30 may be, for example, a passenger transport vehicle such as a taxi or a bus, a cargo transport vehicle that transports cargo, or the like.

With the system 10, the position of the person 70 who carries the communication terminal 20 can be acquired with a high precision. This makes it possible to enhance effectiveness of the application that uses the position of the communication terminal 20.

Figure 2:
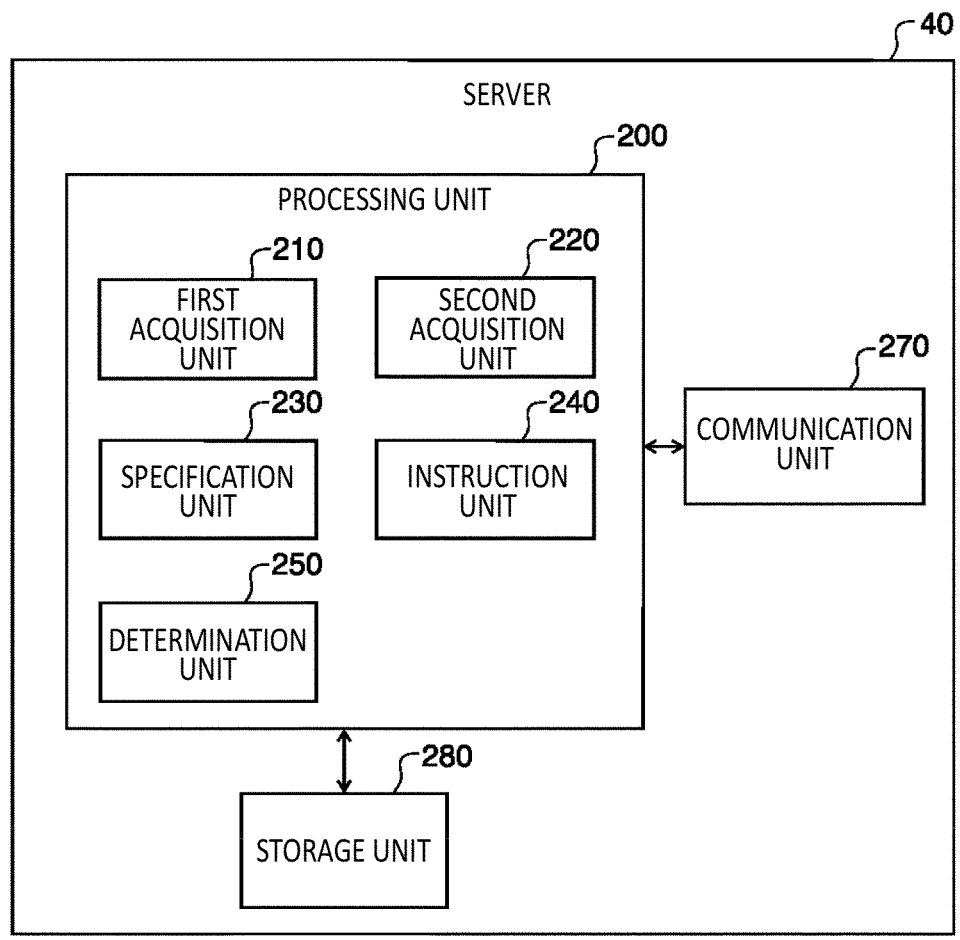
FIG. 2 shows a functional configuration of a server 40.

FIG. 2 shows a functional configuration of a server 40. The server 40 includes a processing unit 200, a storage unit 280, and a mobile communication unit 270. The processing unit 200 includes a first acquisition unit 210, a second acquisition unit 220, a specification unit 230, an instruction unit 240, and a determination unit 250.

The server 40 may be configured to include a computer. The processing unit 200 may be implemented by a processor such as a CPU that performs calculation processing. The storage unit 280 may include a nonvolatile storage medium such as a flash memory or a volatile storage medium such as a random access memory. The mobile communication unit 270 may be implemented by a communication processor. The server 40 may execute various processes by the processing unit 200 being operated according to a program stored in the nonvolatile storage medium that is included in the storage unit 280.

The first acquisition unit 210 acquires the position information of the communication terminal 20 that is movable, and the precision information indicating the precision of the position information. For example, the first acquisition unit 210 acquires the position information detected by the communication terminal 20 based on a signal received from a positioning satellite, and the precision information indicating the precision of the position information. The precision of the position information may be determined by a positioning method that can be used by the communication terminal 20, and an antenna performance.

The specification unit 230 specifies, based on the position information and the precision information, an area where the precision of the position information is lower than a predetermined value, among a plurality of areas where the communication terminals 20 exist. The precision of position information may change under an environment in which the communication terminal 20 is used. For example, the precision of position information may change by the positioning satellite from which the signal can be received at a location where the communication terminal 20 is used, and a radio wave intensity from the positioning satellite.

The instruction unit 240 instructs the moving object 30 which has a function of acquiring the position information of the communication terminal 20, to move to the area specified by the specification unit 230, in order to cause the moving object 30 to measure the position of the communication terminal 20.

The second acquisition unit 220 acquires position information of each of the communication terminals 20 measured by the moving object 30. The communication unit 270 transmits, to the communication terminal 20, information based on the position information of each of the communication terminals 20 measured by the moving object 30.

The determination unit 250 determines a traffic risk in the area specified by the specification unit 230, based on the position information of the communication terminal 20 acquired by the second acquisition unit 220. The communication unit 270 transmits, to the communication terminal 20, the information indicating the traffic risk determined by the determination unit 250.

Figure 3:
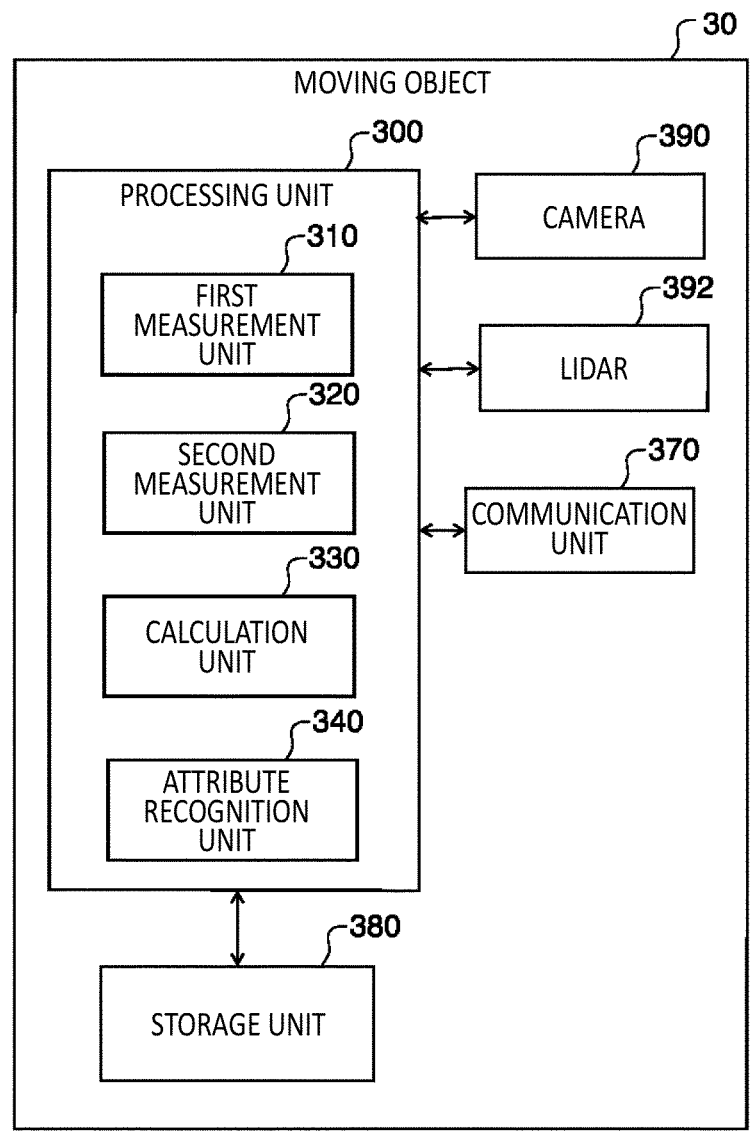
FIG. 3 shows a functional configuration of a moving object 30.

FIG. 3 shows a functional configuration of a moving object 30. The moving object 30 includes a processing unit 300, a storage unit 380, a mobile communication unit 370, a camera 390, and a LIDAR 392. The processing unit 300 includes a first measurement unit 310, a second measurement unit 320, a calculation unit 330, and an attribute recognition unit 340.

The moving object 30 may be configured to include a computer. The processing unit 300 may be implemented by a processor such as a CPU that performs calculation processing. The storage unit 380 may include a nonvolatile storage medium such as a flash memory or a volatile storage medium such as a random access memory. The mobile communication unit 370 may be implemented by a communication processor. The moving object 30 may execute various processes by the processing unit 300 being operated according to a program stored in the nonvolatile storage medium that is included in the storage unit 380.

The camera 390 captures an image of an outside of the moving object 30 to output image information. The camera 390 may output information indicating a distance to a subject by a phase difference detection method. The LIDAR 392 is an example of a light ranging device that uses light to detect the distance to an object. The light which is used by the LIDAR 392 may be laser light, infrared light, or the like.

The first measurement unit 310 measures a geographical position of the moving object 30 based on the signal received from the positioning satellite. The second measurement unit 320 measures a position of the communication terminal 20 with respect to the moving object 30. The calculation unit 330 calculates a geographical position of the communication terminal 20, based on the geographical position measured by the first measurement unit 310 and the position of the communication terminal 20 with respect to the moving object 30 measured by the second measurement unit 320.

The communication unit 370 transmits, to the server 40, the geographical position of the communication terminal 20 calculated by the calculation unit 330. In the server 40, the second acquisition unit 220 acquires the position information of each of the communication terminals 20 measured by the moving object 30, by receiving, from the moving object 30, the geographical position of the communication terminal 20 calculated by the calculation unit 330 of the moving object 30.

The second measurement unit 320 may measure the position of the communication terminal 20 with respect to the moving object 30, based on the information detected by at least one of the camera 390 or the LIDAR 392.

In the server 40, when the position of the communication terminal 20 is measured by triangulation in the area specified by the specification unit 230, the instruction unit 240 may instruct three or more moving objects 30 to move to the area specified by the specification unit 230. In this case, the second measurement unit 320 measures the distance between the moving object 30 and the communication terminal 20. The communication unit 270 transmits, to the server 40, the geographical position measured by the first measurement unit 310, and the distance between the moving object 30 and the communication terminal 20 measured by the second measurement unit 320. In the server 40, the second acquisition unit 220 specifies the position of the communication terminal 20 by the triangulation, by using the geographical position of the moving object 30 measured by each of the three or more moving objects 30, and the distance between the moving object 30 and the communication terminal 20 measured by each of the three or more moving objects 30.

The attribute recognition unit 340 acquires attribute information of a user of the communication terminal 20. The attribute information of the user of the communication terminal 20 is, for example, information indicating a gender and an age of the person 70, whether the person 70 is a pedestrian, or the like. The attribute recognition unit 340 may acquire attribute information of the person 70 by recognizing the image captured by the camera 390. The communication unit 370 transmits, to the server 40, the attribute information of the person 70 recognized by the attribute recognition unit 340.

In the server 40, the first acquisition unit 210 further acquires attribute information of the user of the communication terminal 20. The second acquisition unit 220 further acquires the attribute information of the user of the communication terminal 20 recognized by the moving object 30. By collating the acquired attribute information with the attribute information acquired by the first acquisition unit 210, the second acquisition unit 220 determines whether the communication terminal 20 of which the position is measured by the moving object 30, corresponds to the communication terminal 20 of which the position is acquired by the first acquisition unit 210.

Figure 4:
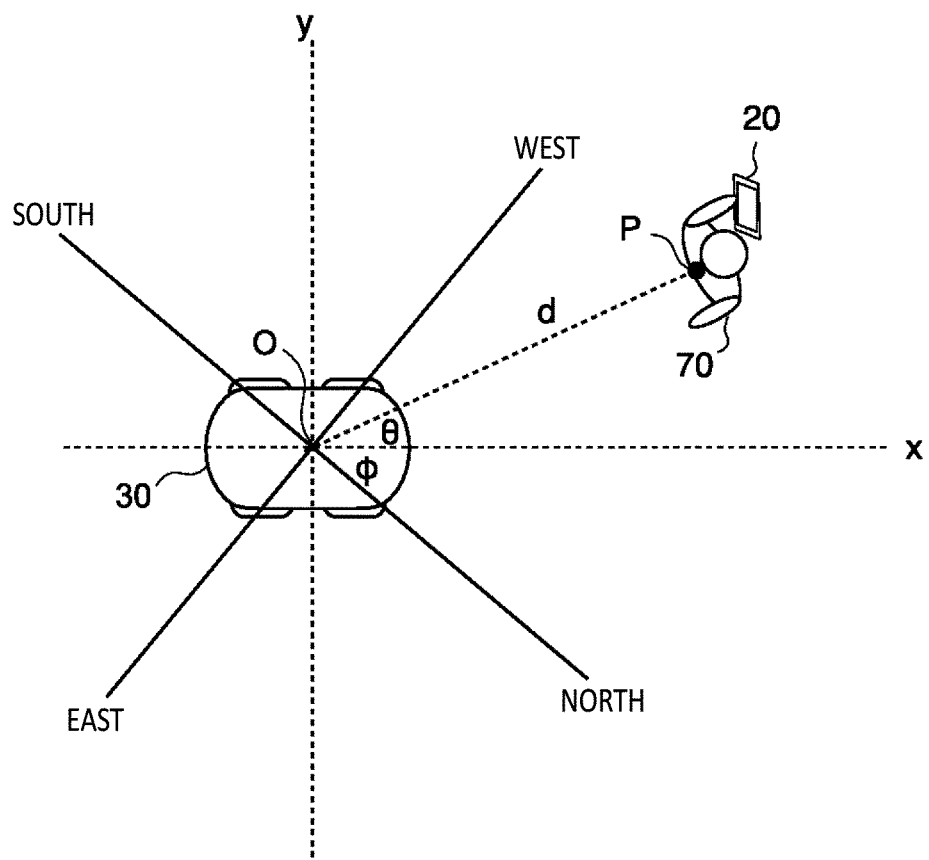
FIG. 4 shows an example of a method of calculating a position of a person 70, in the moving object 30.

FIG. 4 shows an example of a method of calculating a position of a person 70, in the moving object 30. In the moving object 30, the first measurement unit 310 calculates a latitude and a longitude of a current position O of the moving object 30, based on the signal received from the positioning satellite that constitutes a Global Positioning System (GNSS). The first measurement unit 310 has a function of measuring the geographical position O with a high precision by the RTK (Real Time Kinematic) positioning. A measurement error of the first measurement unit 310 may be a centimeter order.

The second measurement unit 320 measures a distance d to a position P of the person 70 recognized by the camera function and/or the LIDAR. The camera function and/or the LIDAR acquires information in a predetermined range centered on the advance direction (an x axis direction) of the moving object 30. In addition to the distance d, the second measurement unit 320 calculates an angle θ indicating a direction in which the person 70 is recognized, with the advance direction (the x axis direction) of the moving object 30 as a reference.

The calculation unit 330 calculates the latitude and longitude information of the position P, based on latitude and longitude information of a position O obtained by the first measurement unit 310; the distance and the angle θ measured by the second measurement unit 320; and an azimuth angle φ of an x axis with respect to an axis in a north and south direction. The communication unit 370 transmits, to the server 40, the calculated latitude and longitude information of the position P.

Figure 5:
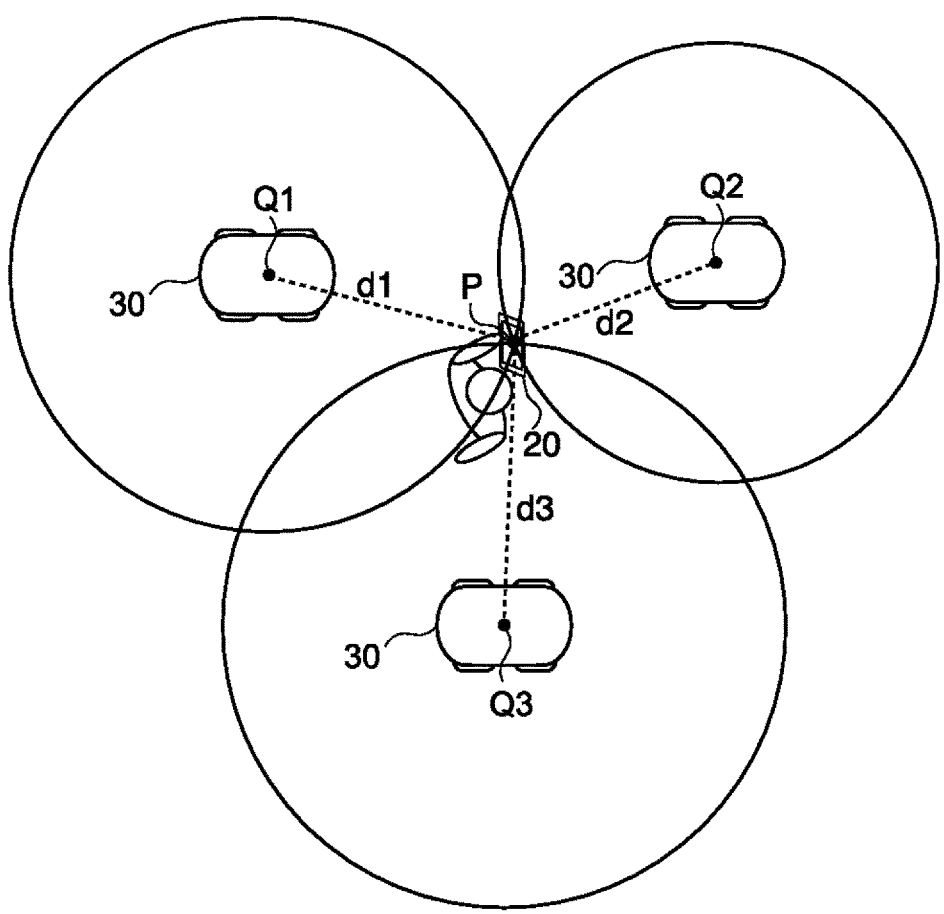
FIG. 5 shows an example of a method of calculating the position of the person 70 by three moving objects 30.

FIG. 5 shows an example of a method of calculating the position of the person 70 by three moving objects 30. As described above, in the respective three moving objects 30, the first measurement unit 310 measures the latitude and longitude information of positions Q1, Q2, and Q3 of the respective moving objects 30.

In the respective three moving objects 30, the second measurement unit 320 measures distances d1, d2, and d3 from the moving objects 30 to the communication terminal 20, based on the received radio wave intensity of the signal received from the communication terminal 20 by Bluetooth (registered trademark) and/or Wi-Fi (registered trademark). In each of the moving objects 30, the communication unit 370 transmits, to the server 40, the position of the moving object 30 and the distance to the communication terminal 20.

In the server 40, the second acquisition unit 220 calculates the position P of the communication terminal 20 by the triangulation by using three pieces of information {Q1, d1}, {Q2, d2}, and {Q3, d3}. Specifically, the second acquisition unit 220 calculates, as the position P of the communication terminal 20, an intersection of a circle which is centered on Q1 and has a radius d1, a circle which is centered on Q2 and has a radius d2, and a circle which is centered on Q3 and has a radius d3.

Figure 6:
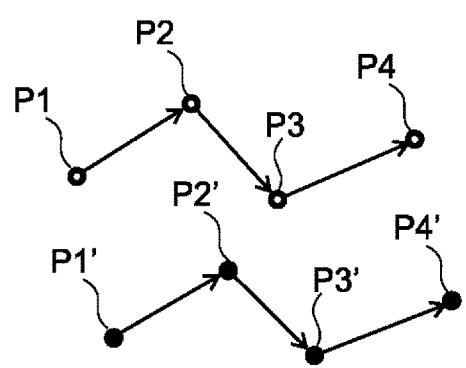
FIG. 6 is a diagram for describing a method of specifying a correspondence between a position of the person 70 or a communication terminal 20 detected by the moving object 30, and a position of the communication terminal 20 acquired from the communication terminal 20 by the server 40.

FIG. 6 is a diagram for describing a method of specifying a correspondence between a position of the person 70 or a communication terminal 20 detected by the moving object 30, and a position of the communication terminal 20 acquired from the communication terminal 20 by the server 40.

In FIGS. 6, P1, P2, P3, and P4 indicate trajectories of the positions detected by one communication terminal 20, which are stored in the server 40. P1', P2', P3', and P4' indicate trajectories of the positions of the one communication terminal 20 detected by the moving object 30. For the trajectories of P1, P2, P3, and P4, and the trajectories of P1', P2', P3', and P4', a position of the base point P1 and a position of the base point P'1 are different from each other. However, a movement direction between P1 and P2 is comparatively consistent with a movement direction between P1' and P2'. Similarly, the movement direction between P2 and P3 is comparatively consistent with a movement vector between P2' and P3', and the movement direction between P3 and P4 is comparatively consistent with the movement direction between P3' and P4'. In this case, the second acquisition unit 220 considers that the positions of the communication terminal 20 of which the positions of P1, P2, P3, and P4 are detected, are actually P1', P2', P3', and P4'.

In this way, the second acquisition unit 220 specifies the position of the communication terminal 20, based on a history of the position which is detected by the communication terminal 20 and is received from the communication terminal 20, and a history of the position of the person 70 or the communication terminal 20 detected by the moving object 30. In this manner, even when the moving object 30 does not receive the information for identifying the communication terminal 20 from the communication terminal 20, it is possible to specify the correspondence between the position of the person 70 or the communication terminal 20 detected by the moving object 30, and the position of the communication terminal 20 acquired from the communication terminal 20 by the server 40.

Note that as described with reference to FIG. 5, when the moving object 30 can communicate with the communication terminal 20 by a wireless signal of the Bluetooth, the Wi-Fi (registered trademark), and/or the like, the moving object 30 may receive identification information of the communication terminal 20 by the wireless signal. The communication unit 370 of the moving object 30 transmits, to the server 40, the identification information received from the communication terminal 20 together with the detected position information of the communication terminal 20, so that it is possible to specify the correspondence between the position of the communication terminal 20 acquired from the communication terminal 20 by the server 40, and the position of the communication terminal 20 detected by the moving object 30.

Other than that, based on the information of the communication terminal 20 or the attribute information of the person 70, the server 40 may specify the correspondence between the position of the communication terminal 20 acquired from the communication terminal 20 by the server 40, and the position of the communication terminal 20 detected by the moving object 30.

For example, the attribute information of the person 70 may be registered in advance in the communication terminal 20. The attribute information of the person 70 which is registered in advance is, for example, the gender and the age. The communication terminal 20 transmits, to the server 40, the attribute information including the registered gender and age of the person 70, in advance or together with the position information of the communication terminal 20.

The attribute recognition unit 340 of the moving object 30 recognizes the gender and the age from the image of the person 70 acquired by the camera function. The communication unit 370 transmits, to the server 40, the attribute information including the gender and the age recognized by the attribute recognition unit 340. The second acquisition unit 220 of the server 40 may specify the correspondence between the position of the communication terminal 20 acquired from the communication terminal 20, and the position of the communication terminal 20 detected by the moving object 30, by collating the attribute information received from the communication terminal 20 with the attribute information received from the moving object 30.

As the attribute information, other than the information registered in advance such as the gender and the age, attribute information detected by the communication terminal 20 by a sensor may be used. For example, the attribute information may be regarding whether the person 70 is a pedestrian, a type of a vehicle in which the person 70 is riding, and the like. An example of the type of vehicle in which the person 70 is riding can include a bicycle, a motorcycle, an automobile, and the like.

The communication terminal 20 may recognize whether the person 70 is a pedestrian, and the type of a vehicle in which the person 70 is riding, by analyzing the information acquired by an acceleration sensor incorporated in the communication terminal 20. Based on the image information around the person 70 acquired by the camera function, the attribute recognition unit 340 of the moving object 30 may recognize whether the person 70 is a pedestrian, and may recognize the type of a vehicle in which the person 70 is riding, when the person 70 is not a pedestrian.

Figure 7:
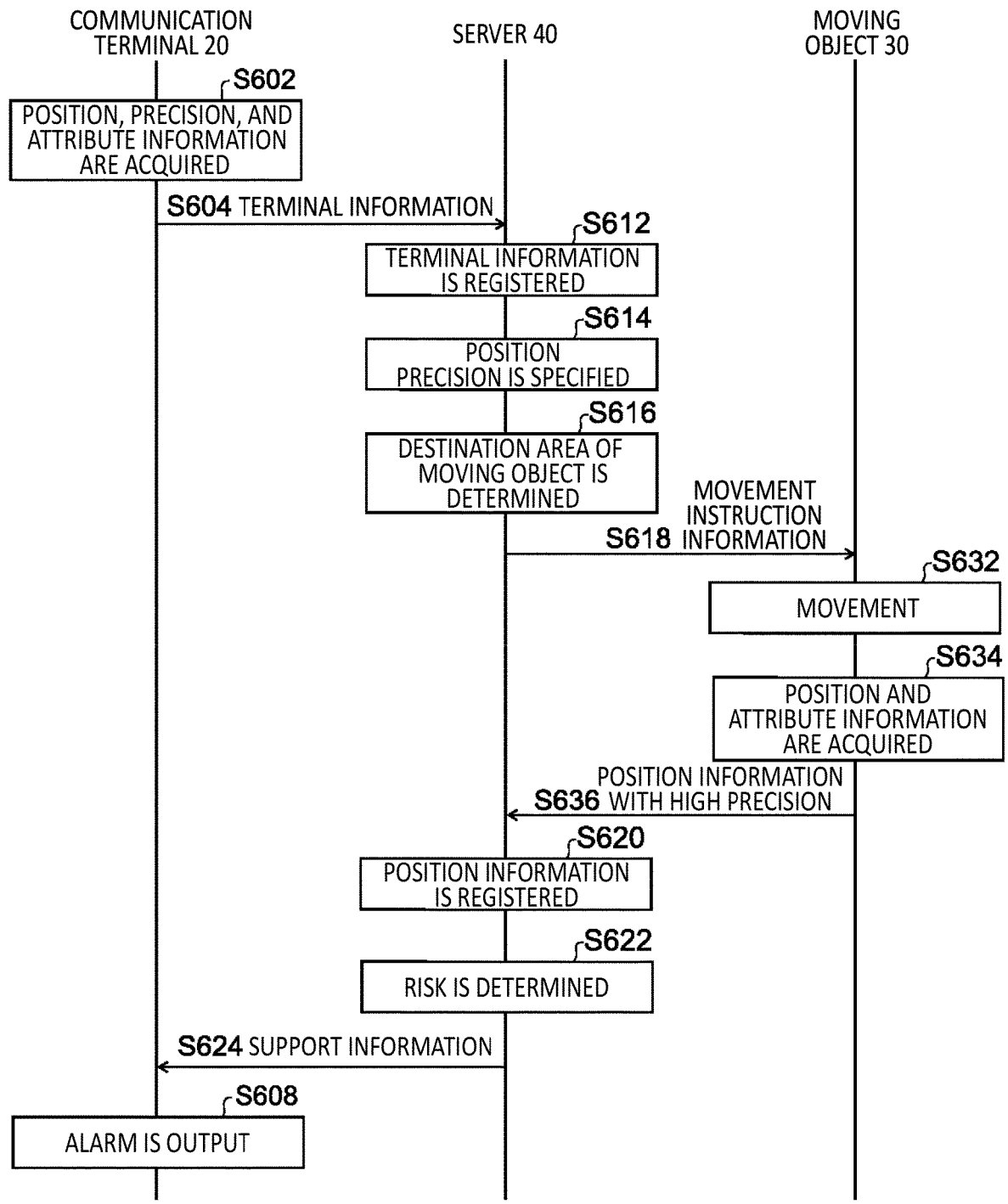
FIG. 7 shows a flow of processing in relation to a method that is executed by the server 40, the communication terminal 20, and the moving object 30.

FIG. 7 shows a flow of processing in relation to a method that is executed by the server 40, the communication terminal 20, and the moving object 30. In S602, the communication terminal 20 acquires the position of the communication terminal 20, the precision of the position, and the attribute information of the person 70 associated with the communication terminal 20. The precision of the position may be, for example, a value which is determined by a positioning method used by the communication terminal 20 to calculate the position. In S604, the communication terminal 20 transmits, to the server 40, the terminal information including the information acquired in S602 and the identification information of the communication terminal 20.

In the server 40, if the mobile communication unit 270 receives communication environment information, the storage unit 280 stores the terminal information received from the communication terminal 20 in association with a time stamp, in S612.

In S614, the specification unit 230 specifies, based on the position information and the precision information stored in the storage unit 280, an area where the precision of the position is lower than a predetermined value, among the plurality of areas where the communication terminals 20 exist.

In S616, the instruction unit 240 determines a destination area of the moving object 30. For example, the instruction unit 240 determines, as the destination area, an area where the precision specified in S614 is lower than a predetermined value.

In S618, in order to move the moving object 30 to the destination area determined in S616, the mobile communication unit 270 transmits movement instruction information to the moving object 30. The movement instruction information may include information indicating the destination area that is an area for the moving object 30 to move to. The movement instruction information may include information indicating the travel path of the moving object 30.

In S632, if the movement instruction information is received from the server 40, the moving object 30 moves to the destination area which is included in the movement instruction information. The moving object 30 may perform patrol travel along the travel path included in the movement instruction information.

In S634, the calculation unit 330 calculates the position of the recognized person 70 or the communication terminal 20, based on the information measured by the first measurement unit 310 and the second measurement unit 320. In a case where it is possible to receive the identification information from the communication terminal 20 when the position information is acquired, the attribute recognition unit 340 recognizes the attribute information of the recognized person 70.

In S636, the communication unit 370 transmits, to the server 40, the position information with a high precision including the position of the person 70 or the communication terminal 20 acquired in S634. In a case where it is possible to receive the identification information from the communication terminal 20 when the position information is acquired, the identification information received from the communication terminal 20 is included in the position information with a high precision. In a case where it is not possible to receive the identification information from the communication terminal 20 when the position information is acquired, the attribute information of the person 70 recognized by the attribute recognition unit 340 is included in the position information with a high precision.

In the server 40, if the communication unit 270 receives the position information with a high precision transmitted from the moving object 30, the storage unit 280 stores the position information based on the position information which is included in the position information with a high precision received from the moving object 30, in association with the time stamp and the identification information of the communication terminal 20, in S620. In a case where the identification information of the communication terminal 20 is not included in the position information with a high precision, by collating the attribute information of the person 70 received together with the identification information from the communication terminal 20, with the attribute information of the person 70 which is included in the position information with a high precision, the second acquisition unit 220 can acquire the identification information of the communication terminal 20 of which the position information is acquired by the moving object 30.

In S622, the determination unit 250 determines whether there is a traffic risk at the position where the communication terminal 20 exists, based on the position information of the communication terminal 20 and the position and speed information of the vehicle 60 received from the vehicle 60. For example, for each of the communication terminals 20, the determination unit 250 determines whether there exists the vehicle 60 that may reach the position of the communication terminal 20 in a predetermined time, among the vehicles 60, and determines that there is a traffic risk at the position where the communication terminal 20 exists in a case where there exists the vehicle 60 that may reach the position of the communication terminal 20 in the predetermined time.

In S624, the communication unit 270 transmits support information to the communication terminal 20 determined to have a traffic risk. For example, the communication unit 270 transmits the support information including a message of an instruction to output an alarm to the communication terminal 20. In S608, the communication terminal 20 that receives the support information outputs the alarm. For example, the communication terminal 20 outputs the alarm by outputting an alarm sound from the communication terminal 20 and/or vibrating the communication terminal 20 in a predetermined vibration pattern. This makes it possible for the person 70 carrying the communication terminal 20 from which the alarm is output, to be aware that there is a traffic risk.

In FIG. 7, as an example of service provision based on the position information of the communication terminal 20, the case of transmitting the support information in relation to a traffic risk is illustrated. However, other than the transmission of the support information in relation to the traffic risk, a service may be provided to the person 70 through an application that uses the position information.

In the above embodiment, the communication terminal 20 has been described to be the terminal that is carried by the person 70. That is, in the above embodiment, the case where a target for enhancing the position precision is the communication terminal 20 that is carried by the person 70, has been described. However, the communication terminal 20 may be provided in movable equipment other than a person, and the function of the communication terminal 20 may be incorporated in the movable equipment. As an example, the communication terminal 20 may be provided in the vehicle 60, and the function of the communication terminal 20 may be incorporated in the vehicle 60. The communication terminal 20 may be provided in the moving object 30, and the function of the communication terminal 20 may be incorporated in the moving object 30. That is, the target for enhancing the position precision may be the moving object 30, other than the person or the vehicle 60.

As described above, with the system 10 according to the present embodiment, it is possible to move the moving object 30 having a mobile communication function to an area with a high traffic risk and an area with a high communication load, and thus it is possible to reduce a communication delay in the mobile communication in each area. This makes it possible to transmit the information in relation to the traffic risk, to the communication terminal 20, with a low delay, in the area with a high traffic risk. Therefore, it is possible to enhance traffic safety.

Figure 8:
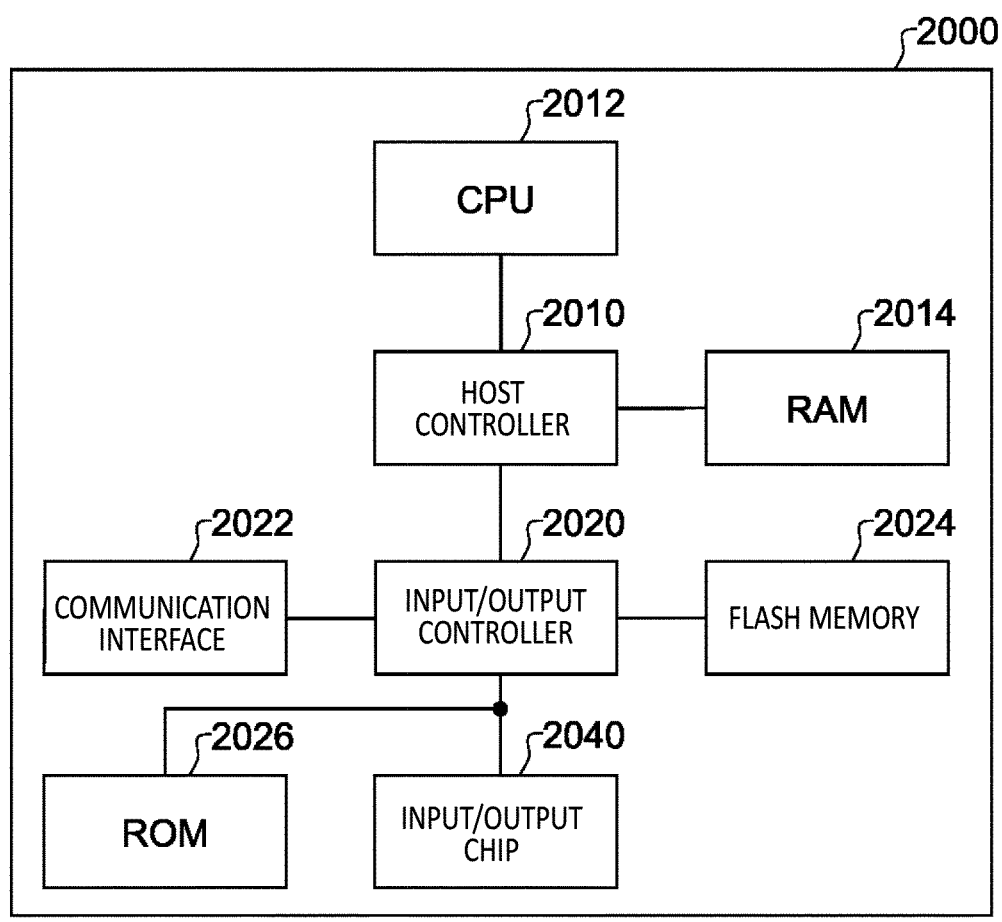
FIG. 8 shows an example of a computer 2000.

FIG. 8 shows an example of a computer 2000 in which a plurality of embodiments of the present invention may be entirely or partially embodied. A program installed on the computer 2000 can cause the computer 2000 to function as a system such as the server 40 or each unit of the system according to the embodiment, or a device such as the moving object 30 or each unit of the device, or cause the computer 2000 to execute an operation associated with the system or each unit of the system, or the device or each unit of the device, and/or cause the computer 2000 to execute a process or steps of the process according to the embodiment. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. The program is installed in the flash memory 2024, the RAM 2014 or the ROM 2026, and executed by the CPU 2012. Information processing written in these programs is read by the computer 2000, and provides cooperation between the programs and the various types of hardware resources described above. A device or a method may be actualized by executing operations or processing of information depending on a use of the computer 2000.

For example, when communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various types of processing on the data on the RAM 2014. Next, the CPU 2012 writes back the processed data into the recording medium.

Various types of information such as various types of programs, data, a table, and a database may be stored in the recording medium, and may be subjected to information processing. The CPU 2012 may execute, on the data read from the RAM 2014, various types of processing including various types of operations, information processing, conditional judgement, conditional branching, unconditional branching, information retrieval/replacement, or the like described in the present specification and specified by instruction sequences of the programs, and write back a result into the RAM 2014. In addition, the CPU 2012 may search for information in a file, a database, or the like in the recording medium. For example, when multiple entries, each having an attribute value of a first attribute associated with an attribute value of a second attribute, is stored in the recording medium, the CPU 2012 may search for an entry having a designated attribute value of the first attribute that matches a condition from the multiple entries, and read the attribute value of the second attribute stored in the entry, thereby obtaining the attribute value of the second attribute associated with the first attribute that satisfies a predefined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

A program that is installed into the computer 2000 and makes the computer 2000 function as the server 40 may work on the CPU 2012 and the like to make the computer 2000 function as respective units of the server 40, respectively. Information processing written in these programs functions as each unit of the server 40 that is specific means by which software and the above-described various hardware resources cooperate by being read by the computer 2000. Then, with the specific means, by achieving computing or processing of information according to an intended use of the computer 2000 in the present embodiment, the specific server 40 is constructed according to the intended use.

Various embodiments have been described with reference to the block diagrams and the like. In the block diagrams, each block may represent (1) a stage of a process in which an operation is executed, or (2) each unit of the device having a role in executing the operation. A specific stage and unit may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer-readable storage medium may include any tangible device capable of storing instructions to be executed by an appropriate device. Thereby, the computer-readable storage medium having instructions stored therein forms at least a part of a product including instructions which can be executed to provide means for executing processing procedures or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or another programmable data processing device, or to a programmable circuit, locally or via a local area network (LAN), wide area network (WAN) such as the Internet, and a computer-readable instruction may be executed to provide means for executing operations specified in the described processing procedures or block diagrams. An example of the processor includes a computer processor, a processing unit, a microprocessor, a digital signal processor, a controller, a microcontroller, or the like.

While the present invention has been described with the embodiments, the technical scope of the present invention is not limited to the above-described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages etc. of each process performed by a device, system, program, and method shown in the claims, specification, or diagrams can be executed in any order as long as the order is not indicated by "before", "prior to", or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10 system
20 communication terminal
30 moving object
40 server 50 base station
60 vehicle
70 person
80 area
200 processing unit
210 first acquisition unit
220 second acquisition unit
230 specification unit
240 instruction unit
250 determination unit
270 communication unit
280 storage unit
300 processing unit
310 first measurement unit
320 second measurement unit
330 calculation unit
340 attribute recognition unit
370 communication unit
380 storage unit
390 camera
392 LIDAR
2000 computer
2010 host controller
2012 CPU
2014 RAM
2020 input/output controller
2022 communication interface
2024 flash memory
2026 ROM
2040 input/output chip.

What is claimed is:

1. A system comprising:
one or more processors, wherein
the one or more processors are configured to:
acquire position information of equipment that is movable, and precision information indicating a precision of the position information;
specify, based on the position information and the precision information, an area where the precision of the position information is lower than a predetermined value, among a plurality of areas where pieces of the equipment exist; and
instruct a moving object which has a function of acquiring the position information of the equipment, to move to the specified area, in order to cause the moving object to measure a position of the equipment.

2. The system according to claim 1, wherein
the one or more processors are further configured to acquire position information of each of the pieces of equipment measured by the moving object.

3. The system according to claim 2, further comprising:
a server including the one or more processors,
wherein
the moving object includes one or more processors, wherein
the one or more processors of the moving object are configured to:
measure a geographical position of the moving object based on a signal received from a positioning satellite,
measure a position of the equipment with respect to the moving object, and
calculate a geographical position of the equipment, based on information of the measured geographical position and the measured position of the equipment with respect to the moving object, and wherein
the one or more processors of the server are further configured to acquire the position information of each of the pieces of equipment measured by the moving object, by receiving, from the moving object, the calculated geographical position of the equipment.

4. The system according to claim 3, wherein
the one or more processors of the moving object are further configured to measure the position of the equipment with respect to the moving object, based on information detected by at least one of a camera or a light ranging device.

5. The system according to claim 2, further comprising:
a server including the one or more processors,
wherein
the one or more processors of the server are configured to instruct three or more moving objects to move to the specified area, and
each moving object of the three or more moving objects includes one or more processors, wherein the one or more processors of the each moving objects are further configured to:
measure a geographical position of the moving object based on a signal received from a positioning satellite, and
measure a distance between each moving object and the equipment, and
the one or more processors of the server are configured to specify the position of the equipment by triangulation, by using the geographical position of the moving object measured by each of the three or more moving objects, and the distance between the moving object and the equipment measured by each of the three or more moving objects.

6. The system according to claim 2, wherein
the one or more processors are further configured to:
acquire attribute information of a user of the equipment, and
acquire attribute information of the user of the equipment recognized by the moving object, and by collating the acquired attribute information with the acquired attribute information, determine whether the equipment of which the position is measured by the moving object, corresponds to the equipment of which the position is acquired.

7. The system according to claim 2, wherein
the one or more processors are further configured to transmit, to the equipment, information based on the position information of each of the pieces of equipment measured by the moving object.

8. The system according to claim 7, wherein
the one or more processors are further configured to determine a traffic risk in the specified area, based on the position information of the acquired equipment.

9. The system according to claim 7, further comprising:
a server including the one or more processors,
wherein
the moving object includes one or more processors, wherein
the one or more processors of the moving object are configured to:
measure a geographical position of the moving object based on a signal received from a positioning satellite,
measure a position of the equipment with respect to the moving object, and
calculate a geographical position of the equipment, based on information of the measured geographical position and the measured position of the equipment with respect to the moving object, and wherein the one or more processors of the server are further configured to acquire the position information of each of the pieces of equipment measured by the moving object, by receiving, from the moving object, the calculated geographical position of the equipment.

10. The system according to claim 9, wherein
the one or more processors of the moving object are further configured to measure the position of the equipment with respect to the moving object, based on information detected by at least one of a camera or a light ranging device.

11. The system according to claim 7, further comprising:
a server including the one or more processors,
wherein
the one or more processors of the server are configured to instruct three or more moving objects to move to the specified area, and
each moving object of the three or more moving objects includes one or more processors, wherein the one or more processors of the each moving objects are further configured to:
measure a geographical position of the moving object based on a signal received from a positioning satellite, and
measure a distance between each moving object and the equipment, and
the one or more processors of the server are configured to specify the position of the equipment by triangulation, by using the geographical position of the moving object measured by each of the three or more moving objects, and the distance between the moving object and the equipment measured by each of the three or more moving objects.

12. The system according to claim 7, wherein
the one or more processors are further configured to:
acquire attribute information of a user of the equipment, and
acquire attribute information of the user of the equipment recognized by the moving object, and by collating the acquired attribute information with the acquired attribute information, determine whether the equipment of which the position is measured by the moving object, corresponds to the equipment of which the position is acquired.

13. The system according to claim 2, wherein
the one or more processors are further configured to determine a traffic risk in the specified area, based on the position information of the acquired equipment.

14. The system according to claim 13, further comprising:
a server including the one or more processors,
wherein
the moving object includes one or more processors, wherein
the one or more processors of the moving object are configured to:
measure a geographical position of the moving object based on a signal received from a positioning satellite,
measure a position of the equipment with respect to the moving object, and
calculate a geographical position of the equipment, based on information of the measured geographical position and the measured position of the equipment with respect to the moving object, and wherein
the one or more processors of the server are further configured to acquire the position information of each of the pieces of equipment measured by the moving object, by receiving, from the moving object, the calculated geographical position of the equipment.

15. The system according to claim 14, wherein
the one or more processors of the moving object are further configured to measure the position of the equipment with respect to the moving object, based on information detected by at least one of a camera or a light ranging device.

16. The system according to claim 13, further comprising:
a server including the one or more processors,
wherein
the one or more processors of the server are configured to instruct three or more moving objects to move to the specified area, and
each moving object of the three or more moving objects includes one or more processors, wherein the one or more processors of the each moving objects are further configured to:
measure a geographical position of the moving object based on a signal received from a positioning satellite, and
measure a distance between each moving object and the equipment, and
the one or more processors of the server are configured to specify the position of the equipment by triangulation, by using the geographical position of the moving object measured by each of the three or more moving objects, and the distance between the moving object and the equipment measured by each of the three or more moving objects.

17. The system according to claim 13, wherein
the one or more processors are further configured to:
acquire attribute information of a user of the equipment, and
acquire attribute information of the user of the equipment recognized by the moving object, and by collating the acquired attribute information with the acquired attribute information, determine whether the equipment of which the position is measured by the moving object, corresponds to the equipment of which the position is acquired.

18. The system according to claim 1, further comprising the moving object.

19. A method comprising:
acquiring position information of equipment that is movable, and precision information indicating a precision of the position information;
specifying, based on the position information and the precision information, an area where the precision of the position information is lower than a predetermined value, among a plurality of areas where pieces of the equipment exist; and
instructing a moving object which has a function of acquiring the position information of the equipment, to move to the area where the precision of the position information is lower than a predetermined value, in order to cause the moving object to measure a position of the equipment.

20. A non-transitory computer-readable storage medium having stored thereon a program that causes a computer to function as:
a first acquisition unit that acquires position information of equipment that is movable, and precision information indicating a precision of the position information;
a specification unit that specifies, based on the position information and the precision information, an area where the precision of the position information is lower than a predetermined value, among a plurality of areas where pieces of the equipment exist; and an instruction unit that instructs a moving object which has a function of acquiring the position information of the equipment, to move to the area specified by the specification unit, in order to cause the moving object to measure a position of the equipment.

\* \* \* \* \*